(12) United States Patent
Ruboyianes et al.

(10) Patent No.: US 10,881,088 B2
(45) Date of Patent: Jan. 5, 2021

(54) FISHING LURE

(71) Applicant: Dreamweaver Lure Company, Inc., Ludington, MI (US)

(72) Inventors: Shane Ruboyianes, Scottville, MI (US); Michiel van de Ven, West Olive, MI (US); Karl Chapel, Grand Haven, MI (US); Robert Chapel, Grand Haven, MI (US)

(73) Assignee: Dreamweaver Lure Company, Inc., Ludington, MI (US)

( * ) Notice: Subject to any disclaimer, the term of this patent is extended or adjusted under 35 U.S.C. 154(b) by 274 days.

(21) Appl. No.: 16/006,918

(22) Filed: Jun. 13, 2018

(65) Prior Publication Data

US 2018/0360012 A1 Dec. 20, 2018

Related U.S. Application Data

(60) Provisional application No. 62/520,759, filed on Jun. 16, 2017.

(51) Int. Cl.
*A01K 85/12* (2006.01)
*A01K 85/08* (2006.01)

(52) U.S. Cl.
CPC .............. *A01K 85/12* (2013.01); *A01K 85/08* (2013.01)

(58) Field of Classification Search
CPC ........ A01K 85/00; A01K 85/08; A01K 85/12; A01K 85/16
USPC ..... 43/42, 42.03, 42.19, 42.21, 42.46, 42.48
See application file for complete search history.

(56) References Cited

U.S. PATENT DOCUMENTS

| | | | | |
|---|---|---|---|---|
| 1,516,707 A | * | 11/1924 | Brown ................... | A01K 85/12 43/42.21 |
| 1,975,218 A | | 10/1934 | Worden | |
| 2,066,815 A | | 1/1937 | Worden | |
| 2,139,424 A | * | 12/1938 | Simon .................... | A01K 85/12 43/42.06 |
| 2,494,407 A | * | 1/1950 | Rhodes ................. | A01K 85/12 43/42.05 |
| 2,569,057 A | * | 9/1951 | Hinerman .............. | A01K 85/12 43/42.14 |
| 2,591,558 A | * | 4/1952 | Kramer ................. | A01K 93/00 43/44.9 |

(Continued)

OTHER PUBLICATIONS

Worden's Lures—Yakima Bait Co., Take 'Em to the Limit, magazine advertisement, Nov./Dec. 1987, one page (p. 52), Nov./Dec. 1987 issue of Charter Industry Trade News, U.S.

(Continued)

*Primary Examiner* — David J Parsley
*Assistant Examiner* — Danielle A Clerkley
(74) *Attorney, Agent, or Firm* — Northern Michigan Patent Law, PLC

(57) ABSTRACT

A spinning fishing lure comprising a winged plug body with a tapered rear portion having an exterior circumferential array of protruding vanes, and a larger substantially cylindrical hollow front portion with an open face and an annular interior volume. The annular interior volume includes a central hollow stem defining a passageway for fishing line and water, and the lower or bottom end of the annular interior volume is partially closed by a tapered interior end wall and vented out the back of the plug body by smaller flow passages.

17 Claims, 4 Drawing Sheets

(56) References Cited

U.S. PATENT DOCUMENTS

| | | | | |
|---|---|---|---|---|
| 2,605,577 A * | 8/1952 | Waugler | A01K 85/02 | 43/42.39 |
| 2,606,387 A * | 8/1952 | Garner | A01K 85/12 | 43/42.2 |
| 2,700,841 A * | 2/1955 | Johnson | A01K 93/00 | 43/17 |
| 2,769,268 A * | 11/1956 | Miller | A01K 85/01 | 43/42.06 |
| 2,885,818 A * | 5/1959 | Frederiksen, Sr. | A01K 85/12 | 43/42.06 |
| 2,952,936 A * | 9/1960 | White | A01K 85/12 | 43/42.21 |
| 2,977,707 A * | 4/1961 | Dreher | A01K 91/08 | 43/42.12 |
| 4,228,612 A * | 10/1980 | Ohmura | A01K 85/00 | 43/43.13 |
| 4,416,080 A * | 11/1983 | Morrissette | A01K 85/12 | 43/42.2 |
| 5,016,387 A * | 5/1991 | Beaupre | A01K 85/12 | 43/42.21 |
| 6,993,866 B1 * | 2/2006 | Strange | A01K 85/01 | 43/42.31 |
| 7,644,533 B2 * | 1/2010 | Hair, III | A01K 85/01 | 43/42.14 |
| 8,943,737 B1 * | 2/2015 | Palmer | A01K 91/06 | 43/4.5 |
| 8,943,738 B2 * | 2/2015 | Parcell | A01K 85/02 | 43/42.4 |
| 2014/0311011 A1 * | 10/2014 | Guntharp | A01K 85/12 | 43/42.09 |
| 2014/0317992 A1 * | 10/2014 | Morgan | A01K 85/08 | 43/42.49 |
| 2014/0360087 A1 * | 12/2014 | Klose | A01K 85/02 | 43/42.26 |
| 2015/0373959 A1 * | 12/2015 | Morgan | A01K 93/00 | 43/42.49 |
| 2016/0205910 A1 * | 7/2016 | Nelson | A01K 85/02 | |

OTHER PUBLICATIONS

United States Department of Commerce Patent and Trademark Office, Registration No. 1686540, trademark registration file history, Dec. 26, 1997, 162 pages, Assistant Commissioner for Trademarks, U.S.

* cited by examiner

FISHING LURE

RELATED APPLICATIONS/PRIORITY BENEFIT CLAIM

This application claims the benefit of U.S. Provisional Application No. 62/520,759, filed Jun. 16, 2017 by the same inventors (Ruboyianes et al.), the entirety of which provisional application is hereby incorporated by reference.

FIELD

The subject matter of the present application is in the field of fishing lures.

BACKGROUND

Fishing lures designed for trolling and fishing in currents are designed to be rotatably attached to a fishing line so that they spin as they are pulled through the water, or as the water flows past them, attracting fish. Some examples are shown in U.S. Pat. Nos. 1,975,218 and 2,066,815 to Worden, with wings that cause the lure to spin, both during a cast and in the water. A similar lure has been sold commercially under the name Spin-N-Glo®, and is also believed to be the subject of U.S. Trademark Reg. No. 1,686,540 to the Yakima Bait Company.

Fishing is both fun and competitive, and anglers are always looking for improvements to the fish-catching action of their lures. The above-mentioned lures have been around for decades, and it is believed that an improved action is both desirable and possible.

BRIEF SUMMARY

The invention is a spinning type lure with an improved fish-catching action.

The lure comprises in general form a tapered cylinder main "plug" body with a pair of spinning wings projecting from the sides. The plug body has a larger diameter front portion, a smaller diameter rear tapered portion, and an array of straight, longitudinal vanes circumferentially and evenly disposed around the outside surface along the tapered rear portion and defining a less-tapered or constant diameter with their outer edges. In a further form the vane array diameter is less than the diameter of the front portion of the plug body.

In a further form, the plug body is substantially hollow over at least the front portion, with an annular front face opening around a central stem. The stem has a longitudinal line passageway for fishing line and for the flow of water therethrough, exiting at the rear end or tail of the plug body. The rear or lower part of the annular interior volume is closed by an interior end wall provided with at least two balanced flow passages located radially outward from the central line passageway, and exiting along opposing sides of the rear tapered portion of the plug body. The interior end wall may be located at or rearwardly of the junction of the front and rear portions of the plug body, so that the annular interior volume coincides with at least the larger diameter front portion of the plug body. The flow passage exits are elongated by virtue of opening onto the rearward tapering sidewall of the rear tapered portion of the plug body.

In a further form, the wings extending radially from the sides of the plug body are bent or curved with radially outermost portions and/or tips extending beyond a maximum tangential width of the plug body, when viewed in plan.

The foregoing features result in an improved spinning and lifting action that is believed to attract fish better than conventional spinning lures. The annular interior volume may also be filled with a fish-attracting scent, and the flow of water through the line and flow inlets and outlets as the lure is pulled through the water results in an improved scent dispersal.

These and other features and advantages of the invention will become apparent from the detailed description below, in light of the accompanying drawings.

DETAILED DESCRIPTION

Figure 1:
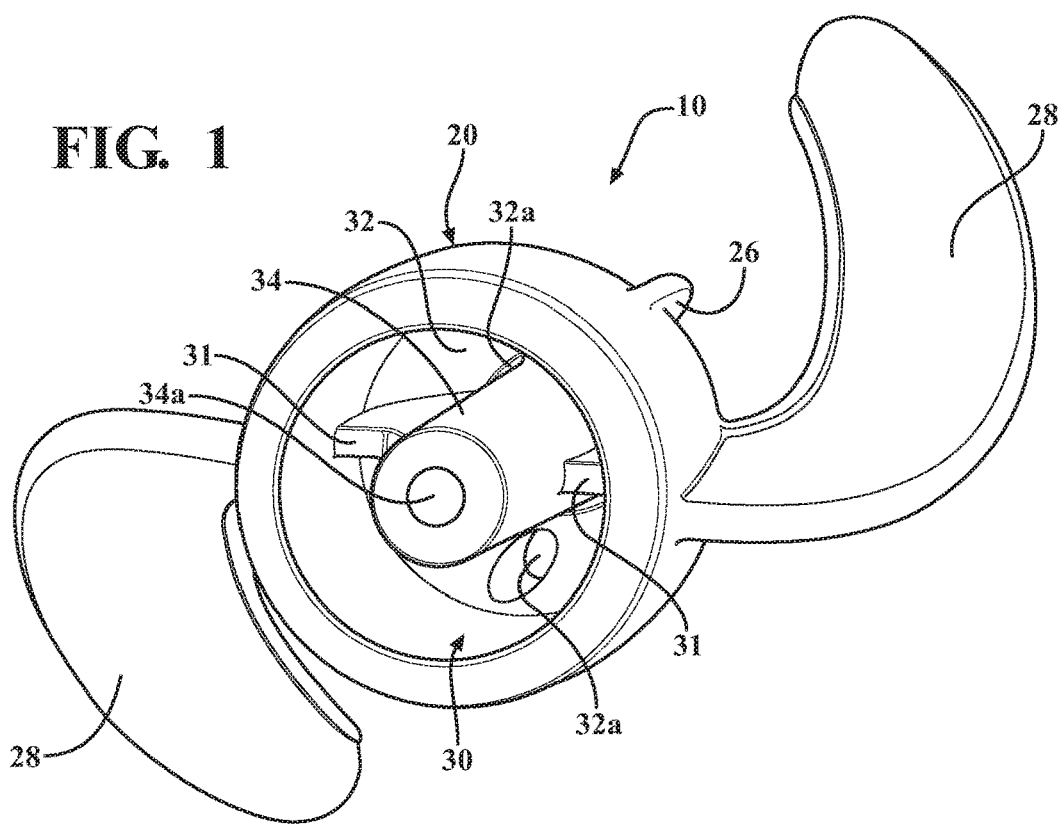
FIG. 1 is a front perspective view of an example spinning lure according to the invention.

Referring first to FIG. 1, a spinning lure 10 is shown in exemplary form in order to teach how to make and use the claimed invention. Lure 10 comprises a plug body 20 formed with a suitable buoyancy, e.g. various plastics typically used for such lures to give them the desired buoyancy characteristics. Plug body 20 has a substantially constant diameter front portion 22 over approximately the first half of its length, and a tapered diameter rear portion 24 over approximately the second or rear half of its length.

The rear tapered portion 24 of plug body 20 is provided with a circumferential array of longitudinal fins or vanes 26 integrally molded therewith, in the illustrated example straight and parallel to one another and to the longitudinal axis Y of the plug body 20. Vanes 26 have side edges 26*a*, and ends 26*b* terminating at tail 25 of the plug body and substantially perpendicular to side edges 26*a*. While the illustrated example shows six vanes 26, the number may vary but with a preferred minimum of three vanes.

Illustrated vane side edges 26*a* define a substantially constant diameter around (and radially spaced from) the sidewall surface of tapered rear portion 24 of plug body 20. Vanes 26 may also be tapered rearwardly, but should be less-tapered than the side surface of rear portion 24 of the plug body to maintain the side edges' outward spacing from the outer surface of rear portion 24 of the plug body.

Illustrated vane side edges 26*a* also define a maximum diameter less than the maximum diameter of substantially cylindrical front portion 22 of plug body 20, for example on the order of 70-90% of the diameter of front portion 22.

Still referring to FIG. 1, lure 10 also includes a pair of spaced spinner wings 28 extending from opposite sides of the surface of front portion 22 of plug body 20. Wings 28 are preferably molded integrally with plug body 20 from the same material, with sufficient thickness to be substantially rigid in use, like a propeller, with minimal or no deformation while spinning through the water, and holding their shape (i.e. not deforming or flexing significantly) during typical handling and storage by a fisherman. Alternately, wings 28 may be formed from a different plastic or other suitable material and attached to plug body 20 using various known techniques including adhesive bonding, insert molding, or others. Illustrated wings 28 have outer side edges 28a that define longitudinally twisted curves extending from the front portion 22 of plug body 20 toward the rear end or tail 25 of the plug body, with radially outermost points 128a located longitudinally upstream or forward of rounded wing tips 28b. In the illustrated example, wing tips 28b are located radially inward of outermost wing tangents 128a.

Figure 3:
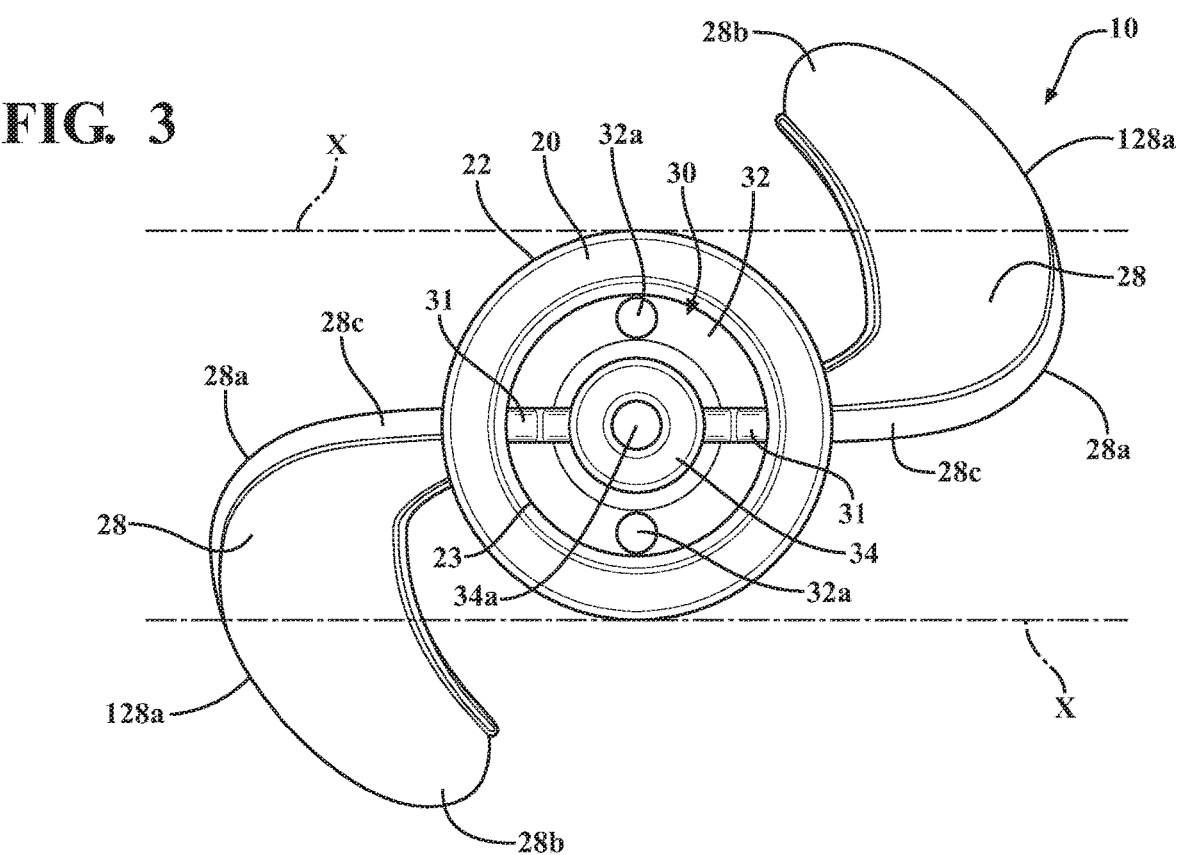
FIG. 3 is a front end elevation view of the lure of FIG. 1.
Figure 4:
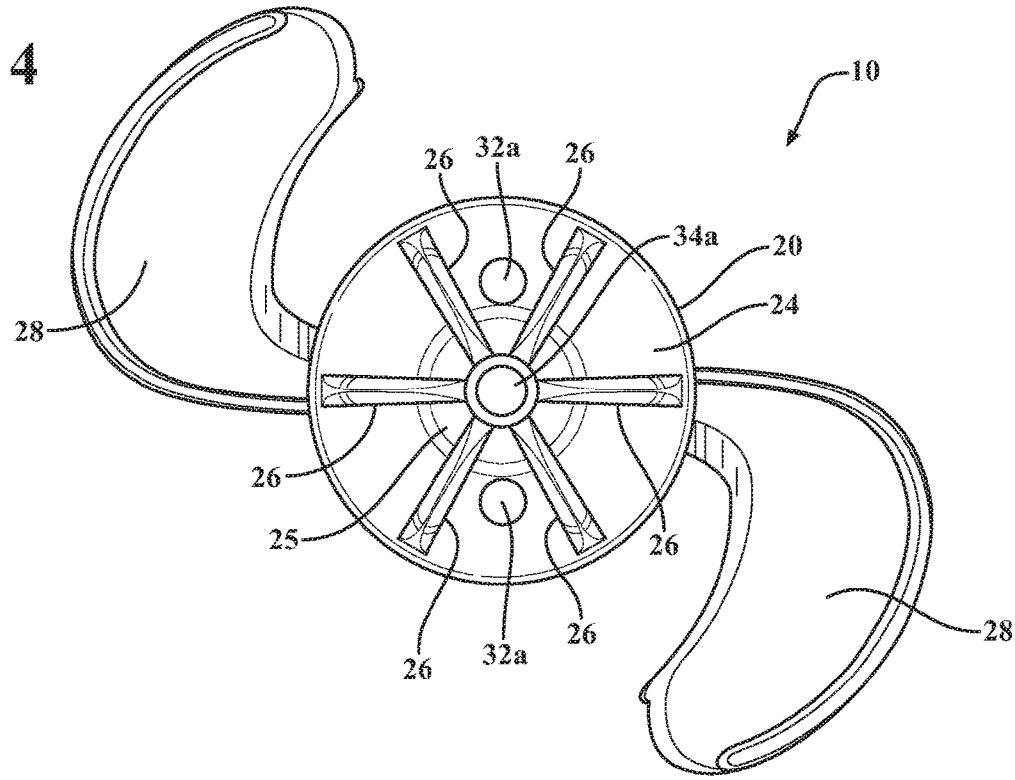
FIG. 4 is a rear end elevation view of the lure of FIG. 1.
Figure 5:
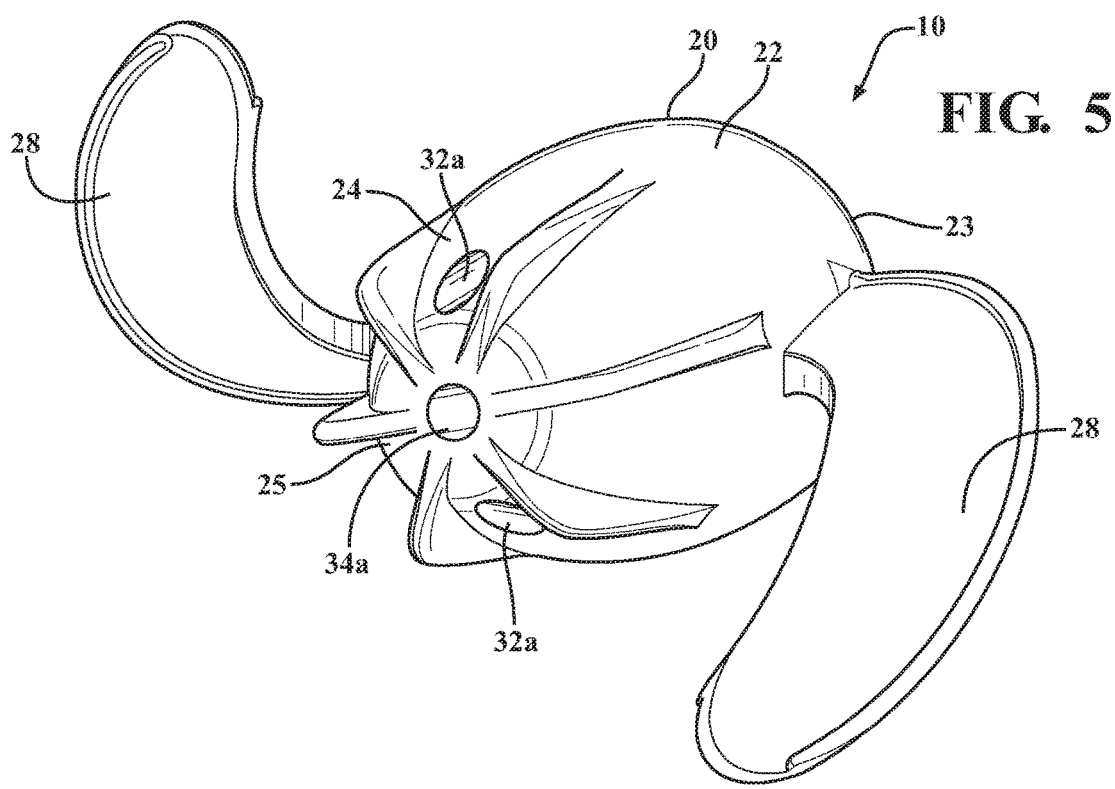
FIG. 5 is a rear perspective view of the lure of FIG. 1.
Figure 6:
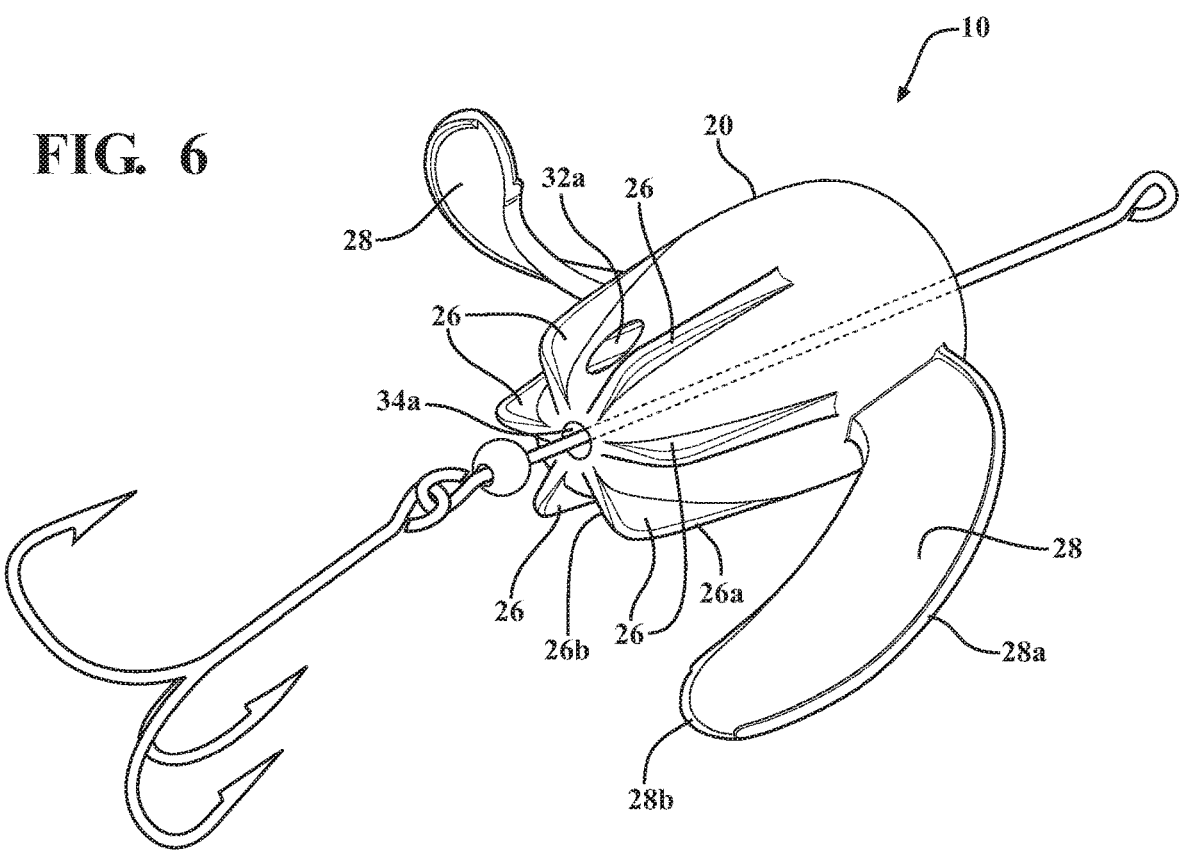
FIG. 6 is a rear perspective view similar to FIG. 5, but showing a fishing line and hook in operative engagement with the lure.
Figure 7:
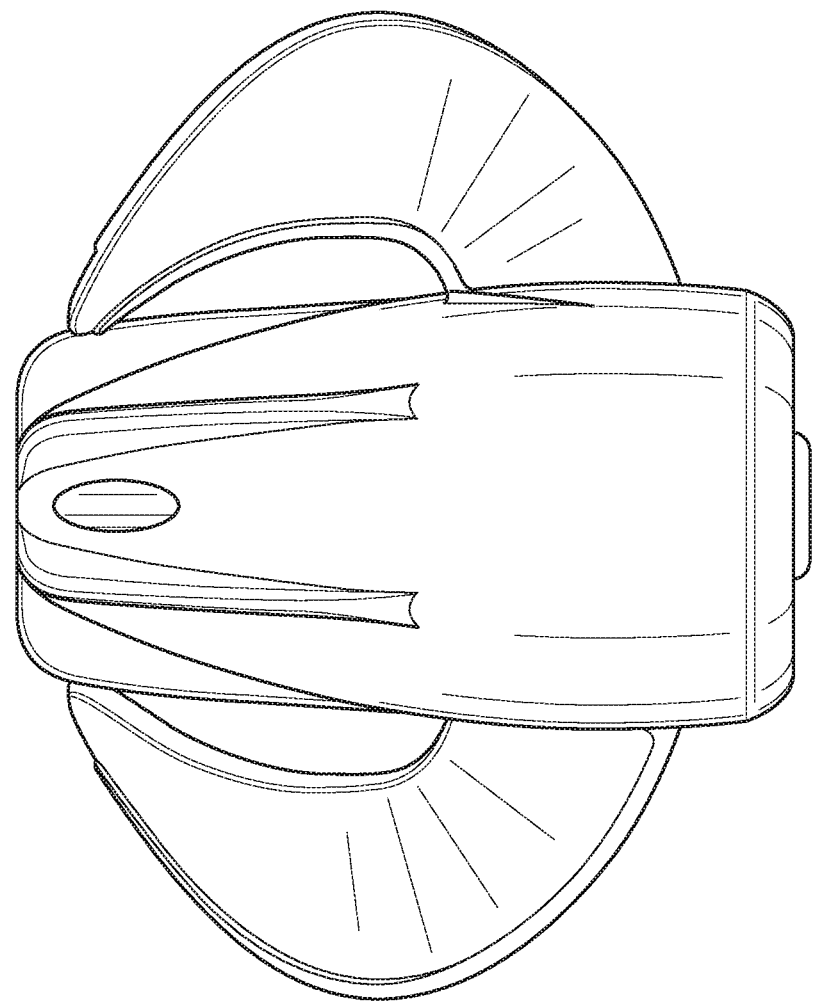
FIG. 7 is a plan view of the lure of FIG. 1.

Referring to FIG. 3, the outer ends 28b of wings 28 extend beyond a maximum tangential width of the plug body as defined by lines X substantially parallel to the leading portions 28c of outer edges 28a when viewed from the front end of the lure. This radial extension of wings 28 imparts a preferred spinning action to the lure.

Vanes 26 are shown as straight vanes, which in combination with the propeller-like twist of the wings 28 keeps the lure spinning true while being pulled through the water. Vanes 26 are also believed to create extra turbulence and scent dispersal as the lure is pulled through the water.

Figure 2:
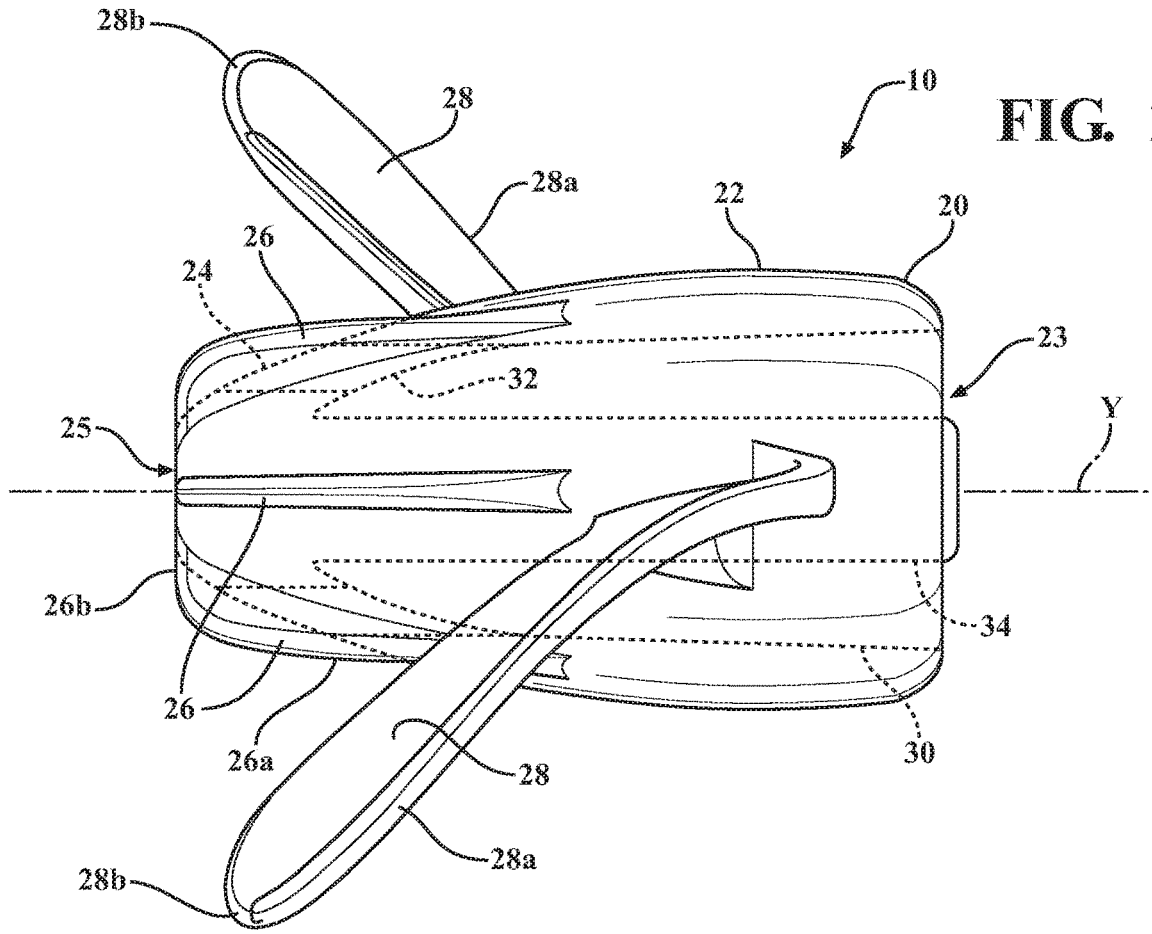
FIG. 2 is a side elevation view of the lure of FIG. 1, with internal passages shown in hidden lines.

Plug body 20 has an annular interior volume 30, shown in hidden lines in FIG. 2, with a central stem 34 defining a longitudinal center line passage 34a and separating the passage from the annular interior volume 30 around it, the annular interior volume terminating at a rear or lower end at interior end wall 32 located within the rear region of the plug body 20 within tapered portion 24. Interior end wall 32 is preferably conical and/or tapered as illustrated, to define interior annular volume 30 as a tapered cavity to smoothly slow the flow of water through the lure and build up and sustain what is believed to be a desirable back pressure that helps drive or lift the lure upwardly. Annular interior volume may also include vertical internal walls 31 connecting or extending between the central stem 34 and the outer wall of the plug body, with a height less than or equal to the height of stem 34. In the illustrated example, vertical internal walls 31 are substantially coextensive with the bases of wings 28 for strength and rigidity, and may even comprise inner portions of the wing bases inserted through corresponding apertures in the plug body wall into the annular interior volume 30 and joined to the central stem 34.

Annular interior volume 30 also provides a receptacle for known fish-attracting scent materials, as well as providing a through-flow of water that when exiting the rear of the plug body 20 is believed to create turbulence and a lifting action.

Central passage 34a opens at a first forward end at the front end 23 of the plug body, and exits centrally at plug body tail 25, so that fishing line and water may pass through passage 34a from the front to the rear of plug body 20 along its longitudinal axis Y.

Water enters annular volume 30 through open front end 23 of the plug body, and exits the plug body through small, evenly spaced flow passages 32a formed through interior volume end wall 32 and opening at opposite points along the sidewall of the rear tapered portion 24 of the plug body. The reduced front sectional area of the flow passages 32a and passageway 34a relative to the greater front sectional area of annular volume 30 is believed to result in a turbulent flow around and behind the plug body that causes a desirable intermittent lifting and jigging action to attract fish, in addition to the spinning action caused by wings 28.

Description of Operation

In operation, the lure 10 is used by threading a fishing line through central passageway 34a and attaching hooks, weights, bait, supplemental lures, etc. behind the tail 25 of the plug body, and then pulling the lure 10 through the water by trolling and/or by repeatedly pulling it manually back and forth through the water or by letting it spin in a river current.

A fish-attracting scent may optionally be inserted into the forward annular interior volume 30 of the plug body 20, and the flow of water through the interior of the plug body helps the scent to be dispersed in a turbulent spinning pattern behind the lure as it is trolled or pulled through the water.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A spinning type fishing lure comprising:
   a tapered cylinder plug body comprising a pair of spinner wings projecting from opposing sides of an outside surface of the plug body, the plug body comprising a hollow open face front portion comprising a first larger diameter portion of the plug body including a maximum diameter of the plug body, and a tapered rear portion comprising a second smaller diameter portion of the plug body decreasing in diameter toward a minimum diameter of the plug body at a tail end;
   a vane array of straight, longitudinal vanes parallel to a longitudinal axis of the plug body and circumferentially and evenly disposed around the outside surface along a length of the tapered rear portion and comprising outer vane edges spaced radially from the outside surface of the tapered rear portion, the outer vane edges defining a vane array diameter greater than the second smaller diameter over the length of the tapered rear portion.

2. The fishing lure of claim 1, wherein the outer vane edges are tapered from a forward end of the tapered rear portion toward the tail end of the plug body such that the vane array diameter is tapered from the forward end of the tapered rear portion toward the tail end of the plug body.

3. The fishing lure of claim 1, wherein the outer vane edges are substantially parallel to the longitudinal axis of the plug body from a forward end of the tapered rear portion to the tail end of the plug body such that the vane array diameter is substantially constant from the forward end of the tapered rear portion toward the tail end of the plug body.

4. The fishing lure of claim 1, wherein the front portion of the plug body comprises an annular interior volume communicating with the open face and extending from the open face rearwardly through the front portion to the tapered rear portion and surrounding a central stem extending through at least the front portion of the plug body, the central stem including a longitudinal line passageway for fishing line and for the flow of water therethrough, the longitudinal line passageway exiting at the tail end of the plug body.

5. The fishing lure of claim 4, wherein the annular interior volume and the central stem extend from an interior wall in the tapered rear portion to the open face of the front portion.

6. The fishing lure of claim 5, wherein the central stem extends beyond the open face.

7. The fishing lure of claim 1, wherein leading edges of the vanes in the vane array are located rearwardly of a junction of the spinner wings with the plug body.

8. The fishing lure of claim 1, wherein terminal ends of the vanes in the vane array are coterminous with the tail end of the plug body.

9. The fishing lure of claim 1, wherein the spinner wings comprise outer side edges that define longitudinally twisted curves extending from the front portion of the plug body toward the tail end of the plug body, the spinner wings further comprising radially outermost points located longitudinally forward of tips of the spinner wings.

10. The fishing lure of claim 9, wherein the spinner wings comprise outermost tangent points at a maximum distance from the outer surface of the plug body, and wherein the tips of the spinner wings are located radially inward of the outermost tangent points.

11. The fishing lure of claim 1, wherein the spinner wings extend from the front portion of the plug body rearwardly to overlie a major portion of the tapered rear portion and the vane array.

12. The fishing lure of claim 1, wherein the first larger diameter portion of the front portion of the plug body has a substantially constant diameter.

13. The fishing lure of claim 1, wherein the vane array diameter is less than the first maximum diameter of the front portion of the plug body.

14. A spinning type fishing lure comprising:
a tapered cylinder plug body comprising a pair of spinner wings projecting from opposing sides of an outside surface of the plug body, the plug body comprising a substantially constant diameter hollow open face front portion comprising a first larger diameter portion of the plug body, and a taperered rear portion comprising a second smaller diameter portion of the plug body decreasing in diameter toward a tail end of the plug body;
a vane array of straight, longitudinal vanes circumferentially and evenly disposed around the outside surface along a length of the tapered rear portion and comprising outer vane edges spaced radially from the outside surface of the tapered rear portion, the outer vane edges defining a vane array diameter greater than the second smaller diameter over the length of the tapered rear portion, wherein the vane array diameter is less than the first larger diameter of the front portion of the plug body.

15. A spinning type fishing lure comprising:
a tapered cylinder plug body comprising a pair of spinner wings projecting from opposing sides of an outside surface thereof, the plug body comprising a substantially constant diameter hollow open face front portion of a first greater diameter, and a tapered rear portion of a second lesser diameter less than the first diameter and decreasing toward a tail end;
a vane array of straight, longitudinal vanes circumferentially and evenly disposed around the outside surface along a length of the tapered rear portion and comprising outer vane edges spaced radially from the outside surface of the tapered rear portion, the outer vane edges defining a vane array diameter greater than the second lesser diameter over the length of the tapered rear portion,
wherein the front portion comprises an annular interior volume around a central stem, the central stem including a longitudinal line passageway for fishing line and for the flow of water therethrough, the longitudinal line passageway exiting at the tail end of the plug body;
wherein the annular interior volume and the central stem extend from an interior wall in the tapered rear portion to the open face of the front portion, and,
wherein the interior wall comprises two balanced flow passages located radially outward from the central line passageway, the flow passages defining a combined flow area less than an area of the open face of the front portion of the plug body and exiting along opposing sides of the rear tapered portion of the plug body.

16. The fishing lure of claim 15, wherein the flow passages comprise longitudinally elongated exit openings on the outer surface of the tapered rear portion of the plug body.

17. The fishing lure of claim 15, wherein the interior wall comprises a conical tapered wall located longitudinally within the tapered rear portion of the plug body and narrowing toward the tail end of the tapered rear portion.

* * * * *

UNITED STATES PATENT AND TRADEMARK OFFICE
CERTIFICATE OF CORRECTION

PATENT NO.        : 10,881,088 B2
APPLICATION NO.   : 16/006918
DATED             : January 5, 2021
INVENTOR(S)       : Shane Ruboyianes et al.

Page 1 of 1

It is certified that error appears in the above-identified patent and that said Letters Patent is hereby corrected as shown below:

In the Claims

Column 5, Claim 13, Line 2, delete "first".

Column 6, Claim 15, Line 29, delete "of the plug body";
      Line 30, change "rear tapered portion of the plug body" to -- tapered rear portion --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*